United States Patent [19]

Hutchison

[11] Patent Number: 4,778,011
[45] Date of Patent: Oct. 18, 1988

[54] SOD UNDERCUTTING KNIFE

[76] Inventor: Marion E. Hutchison, 1249 Ackermant, Waterloo, Iowa 50703

[21] Appl. No.: 889,337

[22] Filed: Jul. 25, 1986

[51] Int. Cl.⁴ .............................................. A01B 45/04
[52] U.S. Cl. ....................................... 172/19; 30/335; 172/701.3; 172/704
[58] Field of Search ................ 172/19, 20, 701.3, 704; 30/62, 162, 329, 335, 337

[56] References Cited

U.S. PATENT DOCUMENTS

| | | | |
|---|---|---|---|
| 392,047 | 10/1888 | Lysle | 172/704 |
| 2,682,824 | 7/1954 | Bowser et al. | 172/19 |
| 2,770,879 | 11/1956 | Seymour | 30/162 X |
| 2,942,674 | 6/1960 | Ditter et al. | 172/20 |
| 3,034,586 | 5/1962 | Ditter | 172/19 |
| 3,357,499 | 12/1967 | Finneyfrock | 172/19 |
| 3,429,377 | 2/1969 | Nunes, Jr. | 172/19 |
| 3,458,981 | 8/1969 | Banner | 172/19 UX |
| 3,509,944 | 5/1970 | Brouwer et al. | 172/19 |
| 3,855,700 | 12/1974 | Gerson et al. | 30/162 |
| 4,015,666 | 4/1977 | Brouwer et al. | 172/19 |
| 4,018,287 | 4/1977 | Brouwer | 172/19 |
| 4,029,152 | 6/1977 | Gerrits | 172/19 |
| 4,109,380 | 8/1978 | Anderson | 30/162 |

OTHER PUBLICATIONS

"R & R Products Co. Is Your Lawn & Turf Parts Manufacturer", Nov. 1985, R&R Products Co., Tucson, Ariz., 85714.

Primary Examiner—Richard T. Stouffer
Attorney, Agent, or Firm—Burd, Bartz & Gutenkauf

[57] ABSTRACT

An undercutting knife for a sod cutting machine consisting of a blade and a blade holder of essentially equal length. The blade is enclosed by the holder except for the projecting forward edge. The blade is light in weight, may have two cutting edges, and is intended to be discarded after use rather than sharpened. The blade maybe frictionally retained within the holder.

11 Claims, 2 Drawing Sheets

SOD UNDERCUTTING KNIFE

FIELD OF THE INVENTION

This invention relates to an undercutting knife for use on a sod cutting machine.

BACKGROUND OF THE INVENTION

Undercutting knives that are in current use on sod cutting machines are thoroughly described by F. J. Ditter's U.S. Pat. No. 3,034,586, issued May 15, 1962, and by Brouwer's U.S. Pat. Nos. 3,509,944, issued May 5, 1970, 4,015,666, issued Apr. 5, 1977, and 4,018,287, issued Apr. 19, 1977. Such knives are intended to be sharpened several times before being discarded, which requires their removal from the sod cutting machine. Such removal customarily requires the removal of several threaded fasteners, and takes an appreciable amount of time that could otherwise be spent cutting sod. This lost time, plus the time spent in sharpening the knife, is very costly for sod producers.

Additionally, unless the sharpening is done very carefully and accurately, the geometry of the knife will be changed, resulting in less than optimum performance. This is particularly true of undercutting knives that are manufactured as an integral unit with the side cutting knives. In these designs, correct sharpening is quite difficult in the corner where the side knives join the undercutting knife.

Undercutting knives are manufactured from steel and are hardened to minimize wear. Since several pounds of steel may be used for each knife, and since the life of a knife is limited, at best, the knives are customarily made from an inexpensive carbon steel such as C-1095. This steel lacks the alloying elements that impart toughness along with high hardness. In order to prevent excessive breakage, then, undercutting blades made from steel such as C-1095 are hardened only moderately. As an example, many blades are manufactured to a hardness of Rc-45. Such blades are not readily broken, but will lose their cutting edge much more rapidly than a harder blade would.

Accordingly, it is an object of the present invention to provide an undercutting knife for a sod cutting machine which includes a blade which contains a very small amount of steel and which therefore can be manufactured from steel of higher quality and greater unit cost than is presently the case. Another object of the invention is to provide an undercutting knife which includes a blade which can be very rapidly removed from the machine and replaced. Another object of the invention is to provide an undercutting knife which includes a blade which is very low in cost, and which can economically be discarded after use, rather than sharpened. Another object of the invention is to provide an undercutting knife with a blade which is unchanging in geometry and cutting depth. Other advantages will be apparent from the following description.

SUMMARY OF THE PRESENT INVENTION

In accordance with the present invention there is provided an improved sod undercutting knife for use on sod cutting and sod harvesting machines. The sod undercutting knife comprises:
(a) a blade;
(b) holder for the blade, the holder being adapted to be attached to the sod cutting machine;
(c) attachment means for attaching the blade to the holder.

BRIEF DESCRIPTION OF THE DRAWINGS

The invention is described in more detail hereinafter with reference to the accompanying drawings, wherein like reference characters refer to the same parts and in which.

DETAILED DESCRIPTION OF THE INVENTION

Figure 1:
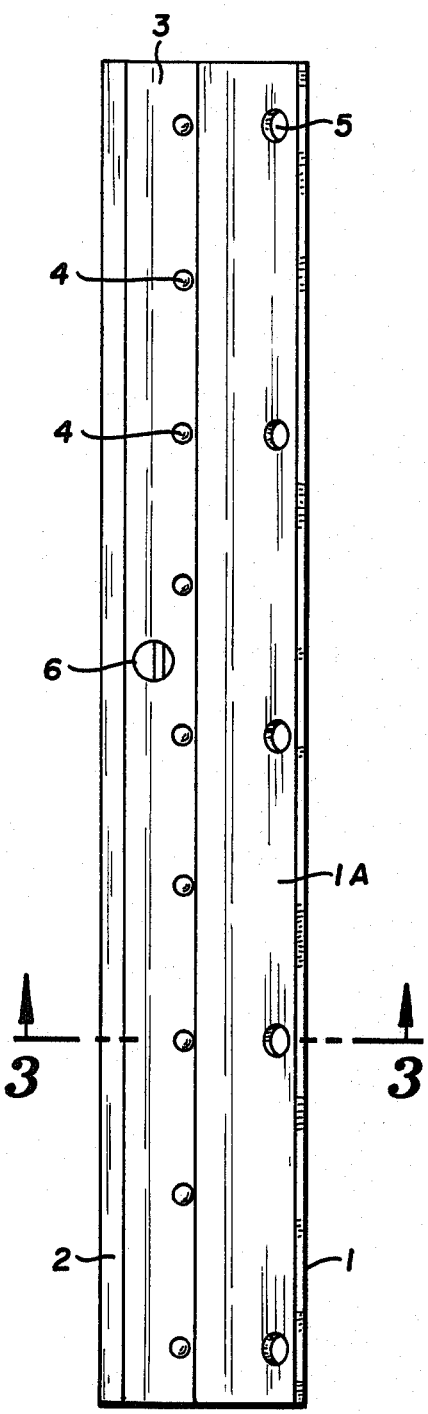
FIG. 1 is a top view of a preferred embodiment of a sod undercutting knife of the invention.
Figure 2:
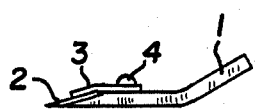
FIG. 2 is a side elevation view of the undercutting knife of FIG. 1.
Figure 3:
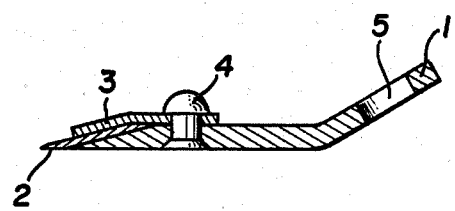
FIG. 3 is a cross-sectional view of the undercutting knife taken along line 3—3 of FIG. 1.

In the drawings showing a preferred embodiment of the present invention, the blade 2, protrudes forwardly out from holder 1, so that the cutting edge of the blade and a minor leading portion of the top and bottom surface of the blade are exposed and made operably available for the cutting of the sod strip.

The holder, 1, comprises a structural member 1-A and a clamping member 3, which are secured together by rivets 4. Both the bottom structural member 1-A and the clamping member 3, extend along essentially the full length of the blade 2. The holder is adapted to be attached to the sod cutting machine by bolts (not shown) extended through holes 5. The clamp 3 is preferably formed of a high strength material such as spring steel.

Figure 4:
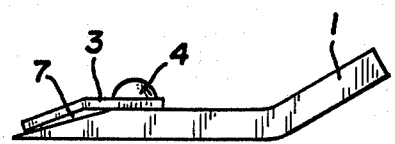
FIG. 4 is a side elevation view of the undercutting knife of FIG. 1, shown with the blade removed.

The clamp 3 is formed to an angle such that when attached to the bottom structural member 1-A as shown in FIG. 4, the slope of the forward portion of the clamp 3 is slightly greater than the corresponding slope of the forward portion of member 1A. At the point of greatest separation, this space, 7, is equal to the thickness of blade 2. Because of the difference in slope, the space 7 is considerably narrower than the thickness of the blade 2 at the most forward point. The blade 2, when driven into place between the bottom member 1 and the clamp 3, will be held in place by a frictional force which will be proportional to the downwardly biasing force exerted by the clamp and coefficients of friction between the blade and the holder.

Since it is common for undercutting knives on sod machines to be reciprocated in a fore and aft direction at relatively high speeds, there is a tendency for the blade to be shaken loose. It is necessary, then, that the frictional retaining force exerted by the downward bias of the clamp be sufficient to hold the blade securely in place.

It will be understood that the separating force due to this reciprocation is directly proportional to the weight of the blade. It is therefore desireable to keep the blade as light as possible. It has been found that a blade width of 0.70 in. to 1.00 in. and thickness of 0.040 in. to 0.060 in. is suitable for most conditions. A blade limited to these dimensions will experience a separation force from the holder of no more than 20-25 lbs. at usual rates and amplitudes of reciprocation. The clamp 3 of FIG. 1 is easily able to restrain the blade under these conditions.

Figure 5:
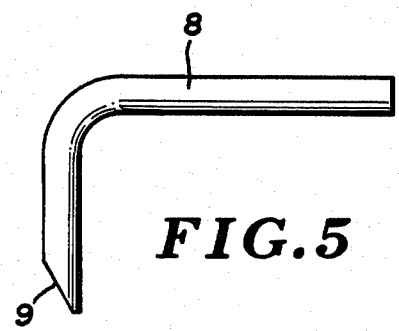
FIG. 5 is a side elevation view of a tool used to facilitate the removal of the blade of the undercutting knife of FIG. 1.
Figure 6:
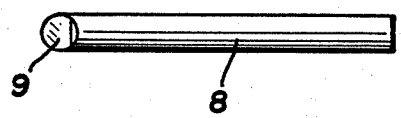
FIG. 6 is a bottom view of the tool of FIG. 5.

When the blade becomes dull and is to be changed, it is removed by means of a key 8 shown in FIGS. 5 and 6. The key, 8, is formed from round bar and includes a flat bevel, 9, on one end. A hole, 6, is only slightly larger in diameter than the key, 8, and goes completely through the clamp 3 and member 1A. The hole 6 is positioned such that the blade 2, when in the normal installed position, partly, but not entirely, closes the hole. To operate the key, the tapered portion, 9, is inserted in the partial hole resulting from the position of the blade 2 relative to hole 6. The key is rotated, forcing the blade away from its seated position. The key may now be rotated back to its initial position and inserted farther into the hole 6, and again rotated to push the blade out farther. Usually two operations of the key in this manner will suffice to move the blade to a point where it is no longer acting to close any part of hole 6.

The hole 6 is preferably positioned slightly to one side of the center of the holder. Since the friction forces tending to hold the blade in place are essentially uniform along the length of the blade, the blade will be retained in its installed position at the end farthest from the hole 5, while the opposite end will move outward farther than it would if the removal forces and restraining forces were perfectly in balance. It has been found that when the hole 6 is ½" in diameter, the blade is sufficiently removed in this manner that it may be gripped at the farthest projecting end and easily pulled from its seat.

Figure 7:
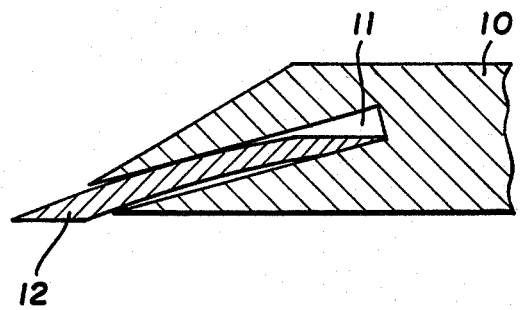
FIG. 7 is an enlarged fragmentary cross section of an alternate means of attaching the blade to the holder.
Figure 8:
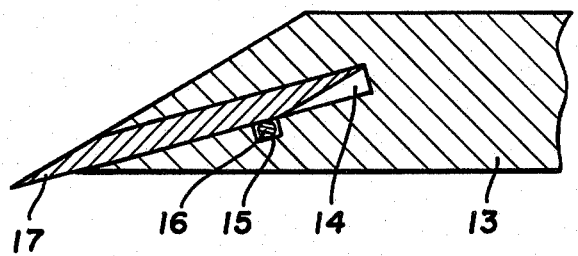
FIG. 8 is an enlarged fragmentary cross section of another alternate means of attaching a blade to a holder.
Figure 9:
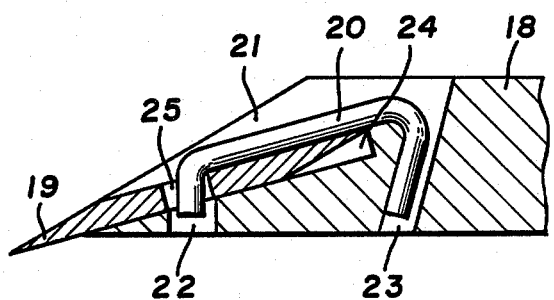
FIG. 9 is an enlarged fragmentary cross section of another alternate means of attaching a blade to a holder.

Other, alternate, means of attaching a blade of the invention to a holder are shown in FIGS. 7, 8, and 9. It will be understood that the holders of these alternate means may include the bolt holes 5 of FIG. 1.

Some means of attaching a blade of the invention to a holder may require that the blade be asymetrical about its longitudinal center line, and in these cases it may not be possible to provide the blade with two opposite sharpened edges so that it is reversible. In the preferred embodiment of FIGS. 1,2,3, and 4, a blade is shown that is reversible, and which provides the user with two sharpened edges.

It will also be understood that the term sharpened edge may have somewhat different meanings when applied to sod undercutting knives used for various soils. Soils containing rocks may require a different type "sharp" edge than peat soils, sandy soils, etc.

In FIG. 7, a groove 11 is provided in holder 10, said groove being slightly wider than the thickness of the blade 12. The blade 12 is bent along its lengthwise centerline to an extent that will cause it to be flattened when pressed into groove 11. The frictional force caused by this flattening action is sufficient to retain the blade in the holder. The groove 11 may be provided either by machining the holder 10 as a single piece, or the holder could be made up of two or more pieces sandwiched together and joined by welding, riveting, etc.

In FIG. 8, a holder 13 is provided with a slot 14 to receive blade 17, and a groove 15 to receive and retain an elastic member 16. The elastic member 16 may be either an elastomer material such as a length of round rubber cord, or a rigid material such as a length of spring wire, in either case being approximately the same length as, but no longer than, the holder 13 and blade 17. In the case where the elastic member is made of spring steel wire, it is crimped or bent slightly at intervals along its length so that it tends to protrude into slot 14 until it is compressed by the installation of blade 17. This compessive force results in a frictional force sufficient to retain the blade 17 in holder 13. If the elastic member 16 is made from an elastomer such as a rubber cord, the depth of groove 15 is regulated such that it is less than the diameter or least cross sectional dimension of the elastic member, causing said elastic member 16 to intrude into groove 14 until it is compressed by the installation of blade 17. The frictional force due to this compression is sufficient to retain blade 17 within slot 14. Holder 13 may be made of multiple pieces in "sandwich" construction and riveted or spot welded together, or may be machined from one solid piece.

In FIG. 9, a holder 18 is provided with a slot 24 to receive blade 19, a spring steel retaining wire 24, holes 22 and 23 which are slightly larger than the diameter of the retaining wire 24, and a slot 21 connecting holes 22 and 23 which is slightly wider than the diameter of retaining wire 24. The blade 19 is prevented from being dislodged from slot 24 in holder 18 unless retaining wire 20 is forced out of hole 24 in the blade 19 by means of a punch inserted through holes 22 and 25. There may be one or any desired number of the retaining means as described by FIG. 9 along the length of the blade and holder.

Many variations of the above described means of attaching the blade to the holder are possible.

What is claimed is:

1. An undercutting knife for a sod cutting machine comprising:
   a generally rectangular blade having a rear edge, a forwardly projecting cutting edge extending generally parallel to the rear edge, and top and bottom flat surfaces, separated by the thickness of the blade, said holder having essentially continuous top and bottom members extending along the entire length of said blade said bottom member having a forwardly and downwardly directed front surface extending along the length of the blade and a rearwardly and upwardly directed back surface having means for detachably connecting said knife to the sod cutting machine, said top member spaced forwardly of the back surface of the bottom member, said holder having a space between said top and bottom members less than the thickness of the blade whereby the top and bottom members firmly grip the top and bottom surfaces of the blade for frictionally retaining said blade on said holder, said top and bottom members of the holder having aligned holes partly closed with said blade adjacent the rear edge of the blade whereby a non-circular tool inserted into the holes and engageable with the rear edge of the blade is usable to release the blade from the holder.

2. The knife of claim 1 wherein: said blade has two alternately usable cutting edges including said forwardly projecting cutting edge.

3. The knife of claim 1 wherein: said holder is essentially continuous along the full length of both the top and bottom surfaces of at least the rear half of said blade.

4. An undercutting knife for a sod cutting machine comprising: a generally rectangular blade having first and second longitudinal edges, a first side, a second side opposite the first side, the opposite first and second sides being separated by the thickness of the blade, a forwardly projecting cutting edge extending longitudinally along said first longitudinal edge of the blade, a generally rectangular holder means adapted to be connected to the sod cutting machine for holding said blade, said holder means including a first member having a forwardly and downwardly directed front surface extending the length of the blade, and a rearwardly directed back surface having means for detachably connected said knife to the sod cutting machine, said holder means further including a second member spaced above the first member and extending the length of the blade providing a space for said blade, said second member spaced forwardly of the back surface of said first member, said blade being located in said space with the cutting edge positioned forwardly of said first and second members, said space being less than the thickness of the blade whereby the first and second members firmly grip the opposite sides of the blade so that said blade is frictionally retained between said first and second members, and at least one of said members having a hole partly closed with said blade adjacent said second edge of the blade whereby a non-circular tool inserted into the hole and engageable with the second edge of the blade is usable to release the blade from the holder.

5. The knife of claim 4 wherein: said second member engages the first side of the blade, and said second side of the blade is held in surface engagement with said front surface of the first member by said second member.

6. The knife of claim 5 wherein: the second member is a clamping member extending downwardly and forwardly at a slope greater than the slope of the front surface of the first member whereby the clamping member frictionally retains the blade on the holder.

7. The knife of claim 6 wherein: the second member is a separate member from the first member, and means securing the second member to the first member.

8. The knife of claim 4 wherein: said second longitudinal edge has a second cutting edge.

9. The knife of claim 4 wherein: said hole is in the second member.

10. The knife of claim 4 wherein: said hole is in the first and second members.

11. An undercutting knife for a sod cutting machine comprising: a generally rectangular blade having a forwardly projecting cutting edge extending longitudinally along a longitudinal edge of the blade, and generally flat top and bottom surfaces, the top and bottom surfaces being separated by the thickness of the blade, generally rectangular holder means adapted to be connected to the sod cutting machine for holding said blade, said holder means including a first continuous member extending the length of the blade, and a second continuous member vertically spaced from the first member and extending the length of the blade providing a space less than the thickness of said blade, said first member having a forwardly and downwardly directed front surface extending along the length of the blade and a rearwardly and upwardly directed back surface having means for detachably connecting said knife to the sod cutting machine, said second member spaced forwardly of the back surface of the first member, said blade being located in said space with the cutting edge positioned forwardly of said first and second members, and said first and second members of the holder means firmly grip the top and bottom surfaces of the blade to frictionally retain the blade on the holder means between the first and second members.

* * * * *